(12) United States Patent
Fladhammer et al.

(10) Patent No.: US 12,103,456 B2
(45) Date of Patent: Oct. 1, 2024

(54) VEHICLE HEADLIGHT AIMING DEVICE

(71) Applicant: Asyst Technologies L.L.C., Kenosha, WI (US)

(72) Inventors: Scott T. Fladhammer, Caledonia, WI (US); Michael B. Grimm, Antioch, IL (US); Peter F. Schwichtenberg, Kenosha, WI (US); Paul M. Sutenbach, Highland Park, IL (US)

(73) Assignee: Asyst Technologies L.L.C., Kenosha, WI (US)

( * ) Notice: Subject to any disclaimer, the term of this patent is extended or adjusted under 35 U.S.C. 154(b) by 219 days.

(21) Appl. No.: 17/816,744

(22) Filed: Aug. 2, 2022

(65) Prior Publication Data
US 2023/0048664 A1    Feb. 16, 2023

Related U.S. Application Data

(60) Provisional application No. 63/362,162, filed on Mar. 30, 2022, provisional application No. 63/260,199, filed on Aug. 12, 2021.

(51) Int. Cl.
*B60Q 1/068* (2006.01)
(52) U.S. Cl.
CPC .................. *B60Q 1/0686* (2013.01)
(58) Field of Classification Search
CPC .... B60Q 1/0686; B60Q 1/0683; B60Q 1/072; B60Q 1/076; B60Q 2200/36
USPC ......... 356/121–123; 362/436, 460, 287, 487, 362/507, 421, 418, 273, 270, 371, 428, 362/430, 514, 524, 515, 423; 33/365, 33/376, 288; 81/484, 488
See application file for complete search history.

(56) References Cited

U.S. PATENT DOCUMENTS

| | | |
|---|---|---|
| 4,703,399 A | 10/1987 | Van Duyn et al. |
| 4,796,494 A | 1/1989 | Eckenrode et al. |
| 5,091,829 A | 2/1992 | Hendrischk et al. |
| 5,197,794 A | 3/1993 | Scott et al. |
| 5,214,971 A | 6/1993 | Burton et al. |

(Continued)

OTHER PUBLICATIONS

Search Report for corresponding European Patent Application No. 22189610.3 dated Dec. 20, 2022.
(Continued)

*Primary Examiner* — Hoa Q Pham
(74) *Attorney, Agent, or Firm* — James A. Joyce; Godfrey & Kahn, S.C.

(57) ABSTRACT

A vehicle headlight aiming device is provided that includes, a device housing having an input drive gear, a screw chamber, an output screw having a screw shaft, a screw first end that is rotationally coupled at least indirectly with the input drive gear, and a screw second end. The device further including an indicator nut having a base with a nut indicator mark, a first leg and second leg extending from a base bottom portion, and an expandable threaded opening extending between a first threaded wall of the first leg and a second threaded wall of the second leg, the threaded walls selectively engageable with a threaded portion of the screw shaft, wherein the threaded opening is expandable to disengage the first threaded wall and the second threaded wall from the threaded portion to allow longitudinal movement of the indicator nut within the device housing without rotating the output screw.

11 Claims, 16 Drawing Sheets

(56) References Cited

U.S. PATENT DOCUMENTS

| | | | |
|---|---|---|---|
| 5,483,426 A | | 1/1996 | Lewis et al. |
| 5,673,993 A | | 10/1997 | Fukui |
| 5,683,163 A | | 11/1997 | Goldschmidt et al. |
| 5,707,133 A | | 1/1998 | Burton |
| 5,758,943 A | | 6/1998 | Shirai et al. |
| 5,897,202 A | | 4/1999 | Denley |
| 5,913,601 A | | 6/1999 | Hans et al. |
| 6,257,747 B1 | * | 7/2001 | Burton ............... B60Q 1/0683 362/524 |
| 7,354,153 B2 | | 4/2008 | Tawada et al. |
| 7,762,686 B2 | | 7/2010 | Fladhammer |
| 10,131,269 B1 | | 11/2018 | Burton |
| 2005/0231967 A1 | * | 10/2005 | Hobbs ............... B60Q 1/076 362/460 |
| 2015/0117042 A1 | | 4/2015 | Burton |

OTHER PUBLICATIONS

Code of Federal Regulations, Title 49—Transportation, "Part 571—Federal Motor Vehicle Safety Standards (FMVSS)." vol. 6 Published Oct. 1, 2019.

* cited by examiner

VEHICLE HEADLIGHT AIMING DEVICE

CROSS-REFERENCE TO RELATED APPLICATIONS

This application claims the benefit of and priority to U.S. Provisional Patent Application No. 63/260,199 filed on Aug. 12, 2021, and U.S. Provisional Patent Application No. 63/362,162 filed on Mar. 30, 2022, the disclosures of which are incorporated herein by reference in their entirety for all purposes.

FIELD OF THE INVENTION

The invention relates generally to vehicle headlamp devices and more particularly to the aiming of vehicle headlamps using adjusters.

BACKGROUND OF THE INVENTION

Vehicles such as automobiles typically have several lamps that can be fixed in a housing supporting a reflector and a lens which are often securely fit into mounting brackets attached to the vehicle. Together, a lamp (or lamps) and a mounting bracket form a complete lamp assembly. Once the lamp assembly has been manufactured and installed into a vehicle, the lamp must be adjusted to the proper aim. Typically, the adjustment is in both the vertical and horizontal directions although, depending on the type of lamp and applicable regulations, adjustment in only one direction may be required. Various automotive headlight and headlight assembly designs use LED and/or high intensity discharge (HID) light sources for primary illumination. The importance of proper aiming of these very bright vehicle headlights to avoid glare that can blind oncoming drivers is known.

One method of adjusting the aim of the lamp involves using an adjuster. The adjuster can be formed as part of the mounting bracket, part of the housing, or can be a separate part between the housing and the mounting bracket (or the reflector directly if no separate mounting bracket is used). One known type of adjuster includes a housing and a ball stud extending therefrom. The ball stud is engaged to the reflector directly or to a mounting bracket on which the reflector is positioned. Actuation or operation of the adjuster causes the ball stud to move. Such movement causes the mounting bracket and/or reflector to pivot or otherwise move with respect to the housing, thereby adjusting the aim of the lamp. One example of this type of adjuster is disclosed in U.S. Pat. No. 6,773,153 to Burton, the disclosure of which is incorporated herein by reference for all purposes. The housing of the adjuster in this Burton design has an opening and a gear positioned inside the housing. The gear is functionally engaged to a ball stud. An input shaft is positioned in the opening and interacts with the gear. Actuation of the input shaft results in rotation of the gear and engaged ball stud. The gear translates actuation of the input shaft into axial movement of the ball stud and its ball stud end. Various other adjusters for aiming headlamp equipment are known, such as disclosed in U.S. Pat. Nos. 7,354,153; 5,707,133; 10,131,269; and 5,214,971 to Burton et al., which are incorporated by reference, as well as U.S. Pat. No. 5,483,426 to Lewis et al., U.S. Pat. No. 4,796,494 to Eckenrode et al., and U.S. Pat. No. 4,703,399 to Van Duyn et al.

Vehicle Safety Standards for headlamp equipment have recognized the importance of proper aiming and suggested that headlamp equipment include a direct reading indicator that is mounted in its entirety on a headlamp or headlamp aiming or headlamp mounting equipment, and provides information about headlamp aim in an analog or digital format. In addition, according to the Vehicle Safety Standards an aiming device with a direct reading indicator should include the necessary references and scales relative to the horizontal plane to assure correct vertical aim for photometry and aiming purposes, along with an equal number of graduations from the "0" position representing angular changes in the axis in the upward and downward directions. Although the benefits of such an aiming device appear desirable, the industry has failed to provide a suitable solution that can be integrated with or secured to an adjuster.

BRIEF SUMMARY OF THE INVENTION

In at least some embodiments, the invention relates a vehicle headlight aiming device comprising: a device housing including a screw chamber, an upper housing portion, and a lower housing portion; an input drive gear; an output screw having a screw shaft with a threaded portion, a screw first end that is rotationally coupled at least indirectly with the input drive gear, and a screw second end; a central longitudinal screw axis extending through the output screw; and an indicator nut having a base with a nut indicator mark, a first leg and second leg extending from a base bottom portion, and an expandable threaded opening extending between a first threaded wall of the first leg and a second threaded wall of the second leg, the first threaded wall and the second threaded wall are selectively engageable with the threaded portion of the screw shaft, wherein a size of the expandable threaded opening is increased via actuation of the first leg and the second leg to thereby disengage the first threaded wall and the second threaded wall from the threaded portion to allow longitudinal movement of the indicator nut within the device housing without rotating the output screw.

Other embodiments, aspects, and features of the invention will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. In the drawings.

DETAILED DESCRIPTION

Figure 1:
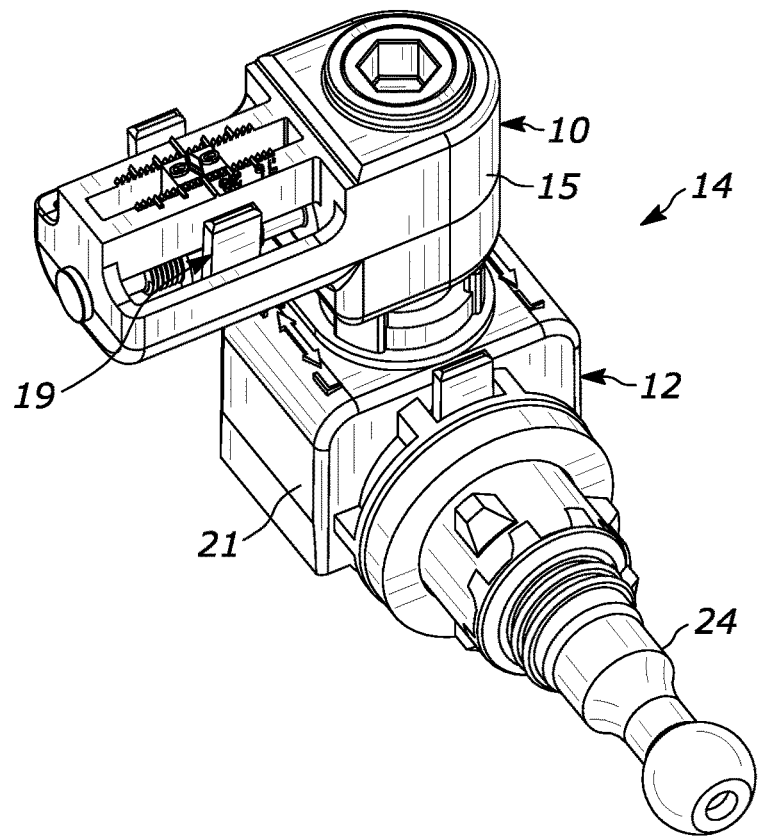
FIG. 1 is a top perspective view of an exemplary adjuster assembly.
Figure 2:
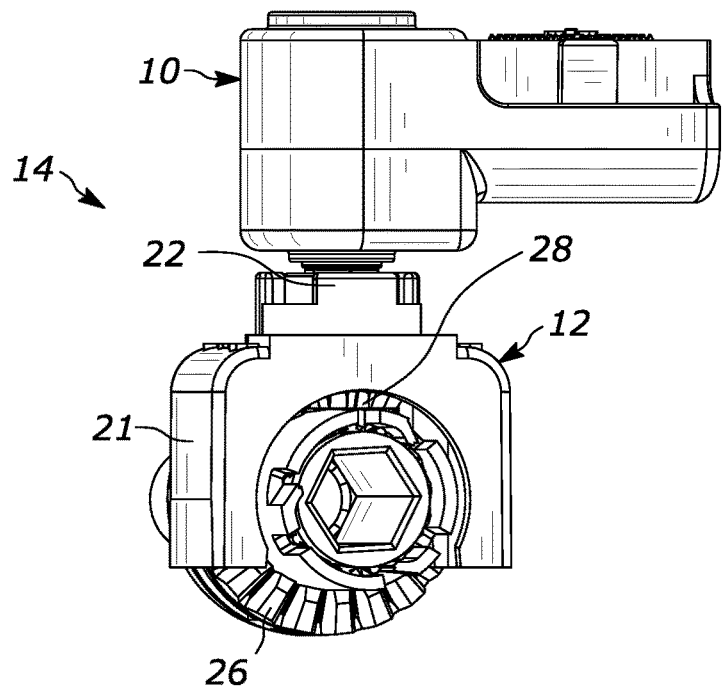
FIG. 2 is a rear perspective view of the adjuster assembly of FIG. 1.
Figure 3:
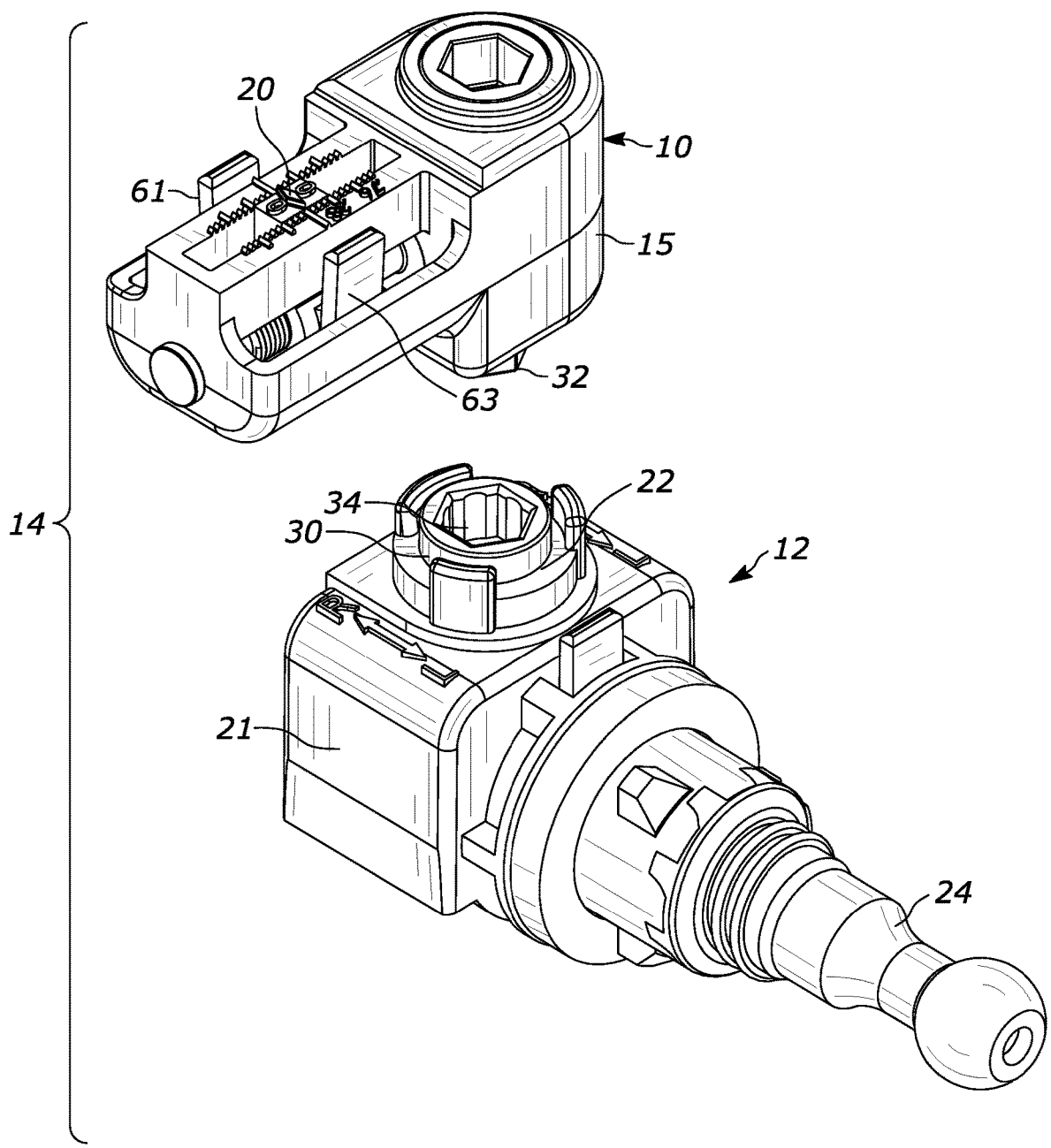
FIG. 3 is a top perspective partially exploded view of the adjuster assembly FIG. 1 with an exemplary first vehicle headlight aiming device spaced from an exemplary lamp adjuster.
Figure 4:
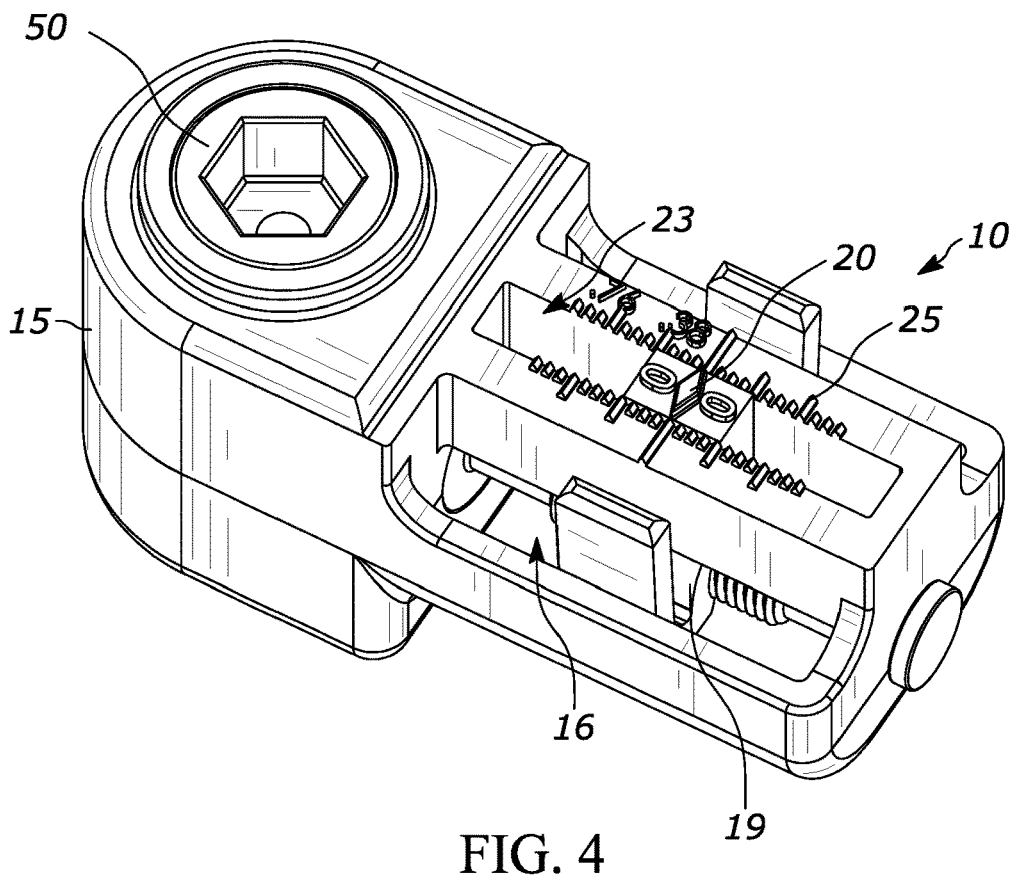
FIG. 4 is a top perspective view of the first vehicle headlight aiming device of FIG. 3 shown with an indicator nut in an engaged position.
Figure 5:
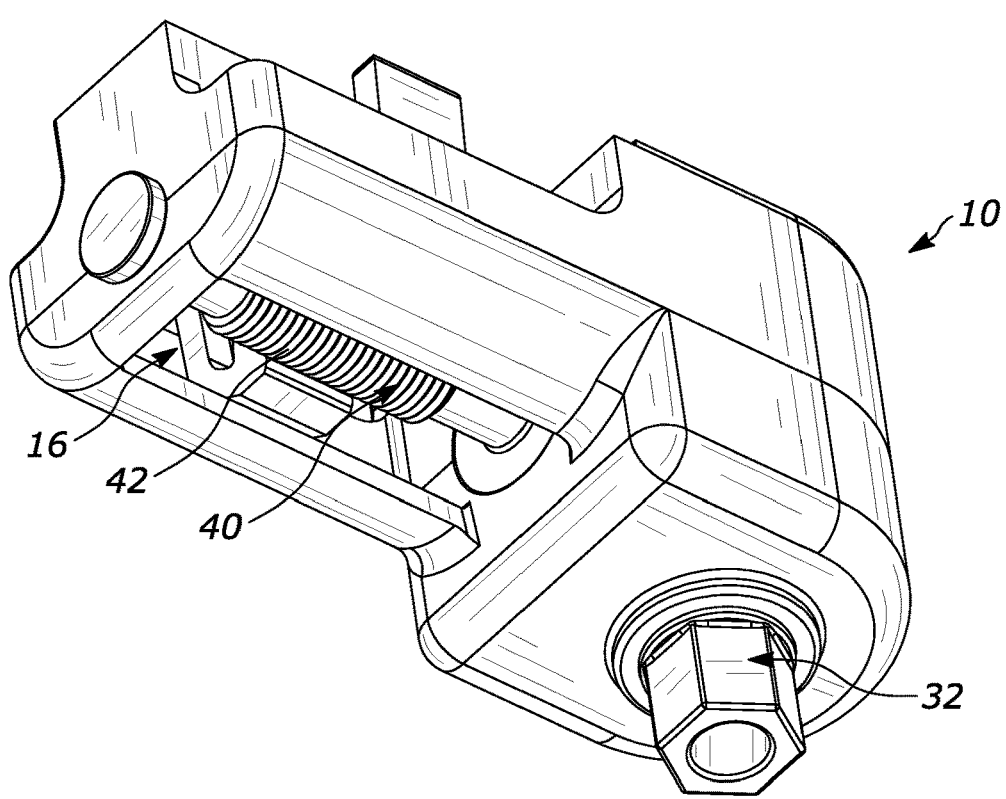
FIG. 5 is a bottom perspective view of the first vehicle headlight aiming device of FIG. 3.
Figure 6:
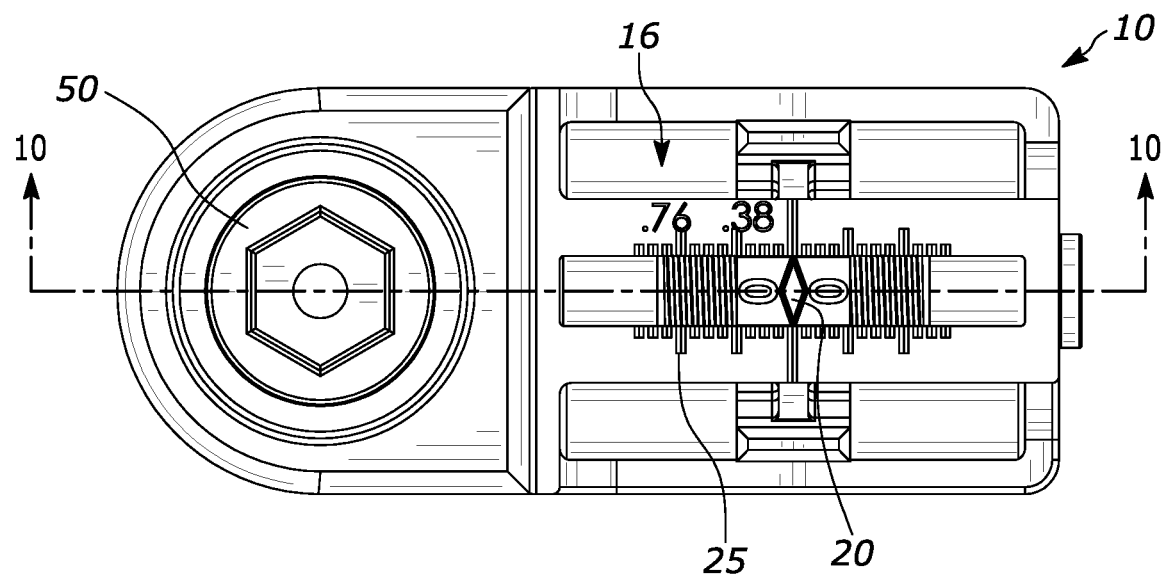
FIG. 6 is a top view of the first vehicle headlight aiming device of FIG. 3.
Figure 7:
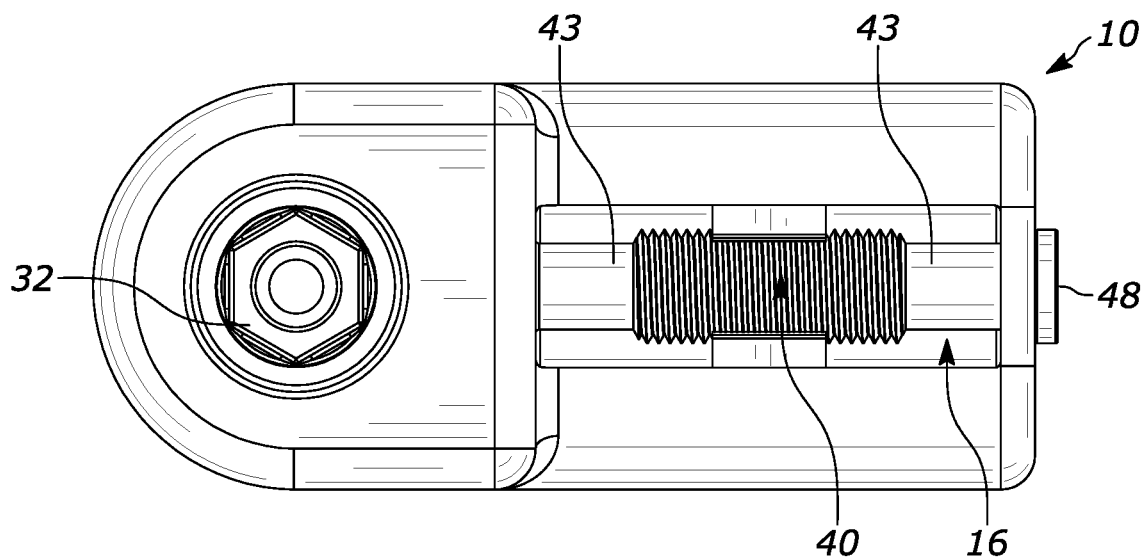
FIG. 7 is a bottom view of the first vehicle headlight aiming device of FIG. 3.

Referring to FIGS. 1 and 2, front and rear perspective views are provided illustrating an exemplary first vehicle headlight aiming device 10 that is coupled to an exemplary lamp adjuster 12 to form an adjuster assembly 14. FIG. 3 illustrates the adjuster assembly 14 with the first vehicle headlight aiming device 10 uncoupled from the adjuster 12. The adjuster 12 can comprise any of various unknown and known adjusters used for aiming headlamp equipment (e.g., lamp, headlight assembly, etc.), such as those described in U.S. Pat. Nos. 10,131,269; 7,762,686; etc. The first vehicle headlight aiming device 10 along with the adjuster 12 can be used to facilitate horizontal adjustment of a lamp or headlight assembly and then be set to indicate the optimal horizontal aim position by manually setting an indicator nut to a zero position. Any subsequent adjustment after optimized aiming is tracked by linear movement of a nut indicator mark away from a zero position. The adjuster 12 is configured to be secured to a vehicle and a lamp or headlight assembly to provide vertical or horizontal aiming and although operatively coupled to the first vehicle headlight aiming device 10, it may not be secured directly thereto.

The first vehicle headlight aiming device 10 includes a device housing 15. The device housing 15 can be formed of two or more portions, such as a lower housing portion 17 and an upper housing portion 18 that are secured together after insertion of various components therein. The device housing 15 further includes a screw chamber 16 formed in the device housing 15 as well as one or more longitudinal slots 23 extending over the screw chamber 16 and in communication therewith. In addition, one or more visible fixed position housing indicator marks 25 are longitudinally spaced along the upper housing portion 18 adjacent the one or more longitudinal slots 23. In other embodiments, the device housing 15 can more or less portions, as well as left and right portions, which when assembled form equivalent lower and upper housing portions as utilized herein. The securement of two or more housing portions can be accomplished using various methods, such as interlocking tabs, welding, etc.

Figure 11:
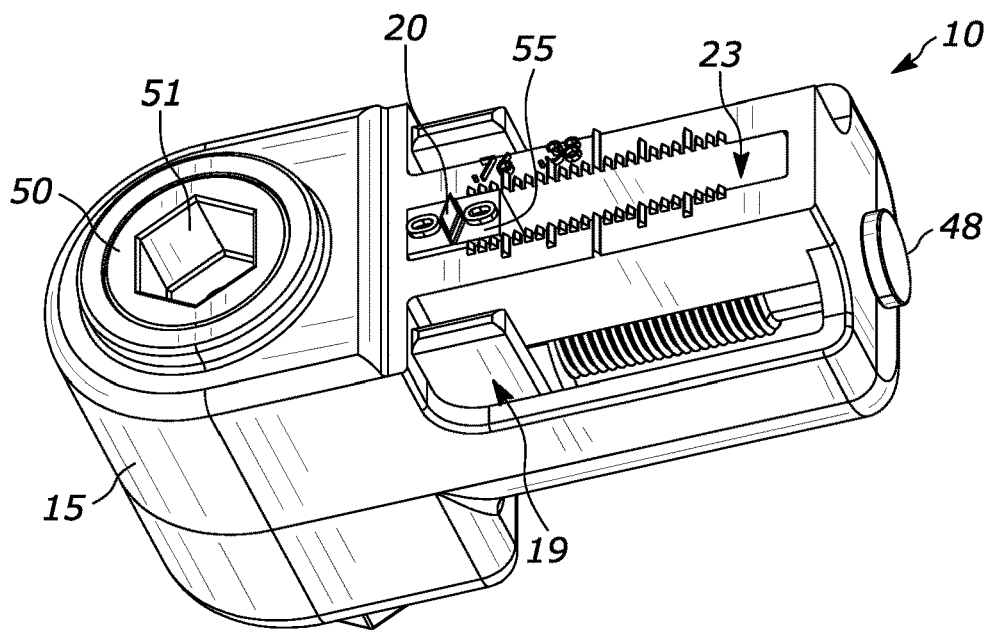
FIG. 11 is a top perspective view of the first vehicle headlight aiming device with the indicator nut in a non-engaged position.

Referring still to FIGS. 1-3, the adjuster 12 includes an adjuster housing 21 having an adjuster upper portion 22. In at least some embodiments, the first vehicle headlight aiming device 10 can be coupled to the adjuster 12 in various ways, for example, in at least some embodiments, the device housing 15 can be formed to matingly engage with the adjuster upper portion 22, while in other embodiments, the device housing 15 and/or adjuster housing 21 can be secured to or formed integrally with, each other in various other ways, as well as with other supports or structure (e.g., vehicle body, headlamp assembly, etc.) wherein the device housing 15 and adjuster housing 21 may or may not be directly coupled (e.g. various types of extensions provided therebetween to transfer the rotational input to the adjuster 12). While in yet other embodiments the device housing 15 can be integrally formed at least in part, with the adjuster housing 21. Further, in at least some embodiments, mounting of the first vehicle headlight aiming device 10 can occur via different fastener or retainer tab geometries with mounting occurring to a back side of a headlamp assembly housing or directly to the adjustment system of the vehicle. An example of direct mounting would be the inclusion of retainer tabs or a screw boss on the adjuster housing 21 or device housing 15. In at least some embodiments the first vehicle headlight aiming device 10 could be supplied to a headlamp manufacturer pre-installed on the adjuster 12 with an indicator nut 19 in a non-engaged position (as discussed below) before aiming has been performed as shown in FIG. 11. Typically, the aiming device would be mounted above the adjuster in a vehicle, although in at least some embodiments, the inputs and outputs of the device and the adjuster can be reversed so that an operator engages the adjuster directly causing the aiming device to respond and indicate position from another desired location, for example as found on various multiple headlight systems that can use gear trains to provide simultaneous adjustments.

Various embodiments of known adjusters are disclosed in the numerous aforementioned patents, which are all incorporated in their entirety herein by reference, as various types of adjusters can be coupled with the aiming device 10 using an output that engages a standard adjuster input for example. In at least some embodiments, the adjuster 12 includes a ball stud 24 translatable towards and away from the adjuster housing 21 using coupled gears, such as a ball stud gear 26 that meshes with an adjuster input gear 28, wherein the adjuster input gear 28 is coupled to an adjuster input head 30 that is sized and shaped to receive an output portion 32 (e.g., a shaped protrusion, mating recess, etc.) of the aiming device 10. In at least some embodiments, the adjuster input head 30 includes a shaped recess 34 therein, while in other embodiments, the adjuster input head 30 can include a shaped protrusion for matingly receiving a recess in the output portion 32.

FIGS. 4-10 provide various exemplary illustrations of the aiming device 10 including perspective, exploded, and cross-sectional views. In at least some embodiments, the aiming device 10 further includes an output screw 38 having a screw shaft 40 with a threaded portion 42, one or more non-threaded portions 43, a screw first end 44 that is rotationally coupled at least indirectly with an input drive gear 46, and a screw second end 48. In at least some embodiments, the screw first end 44 is rotationally coupled with or integrally formed with a screw bevel gear 59 having screw gear teeth 47. The input drive gear 46 can take many forms, although in at least some embodiments it is an integrally formed or separately coupled component that includes the output portion 32, an input portion 50, and drive gear teeth 52.

Figure 8:
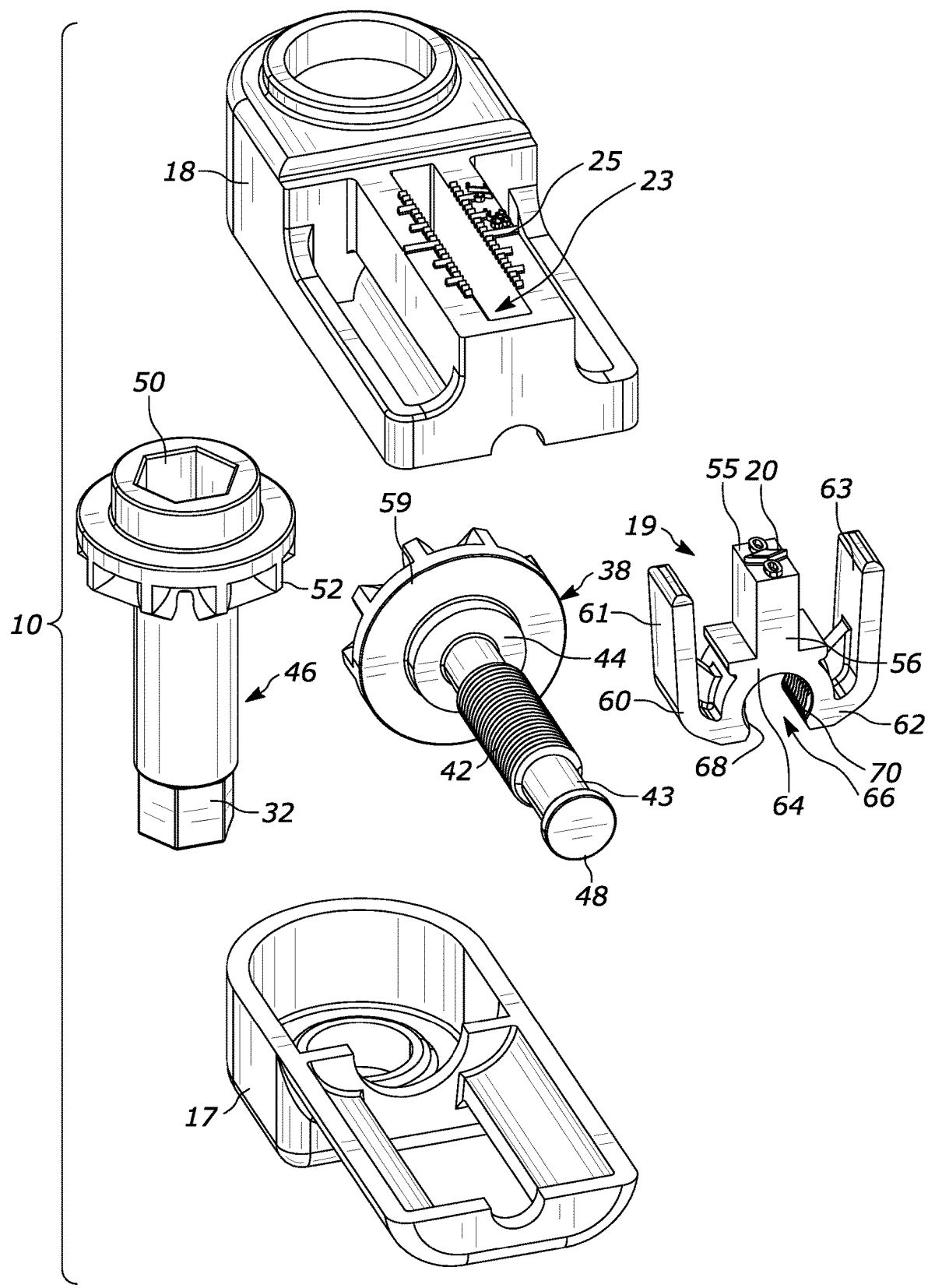
FIG. 8 is a top perspective exploded view of the first vehicle headlight aiming device of FIG. 3.
Figure 9:
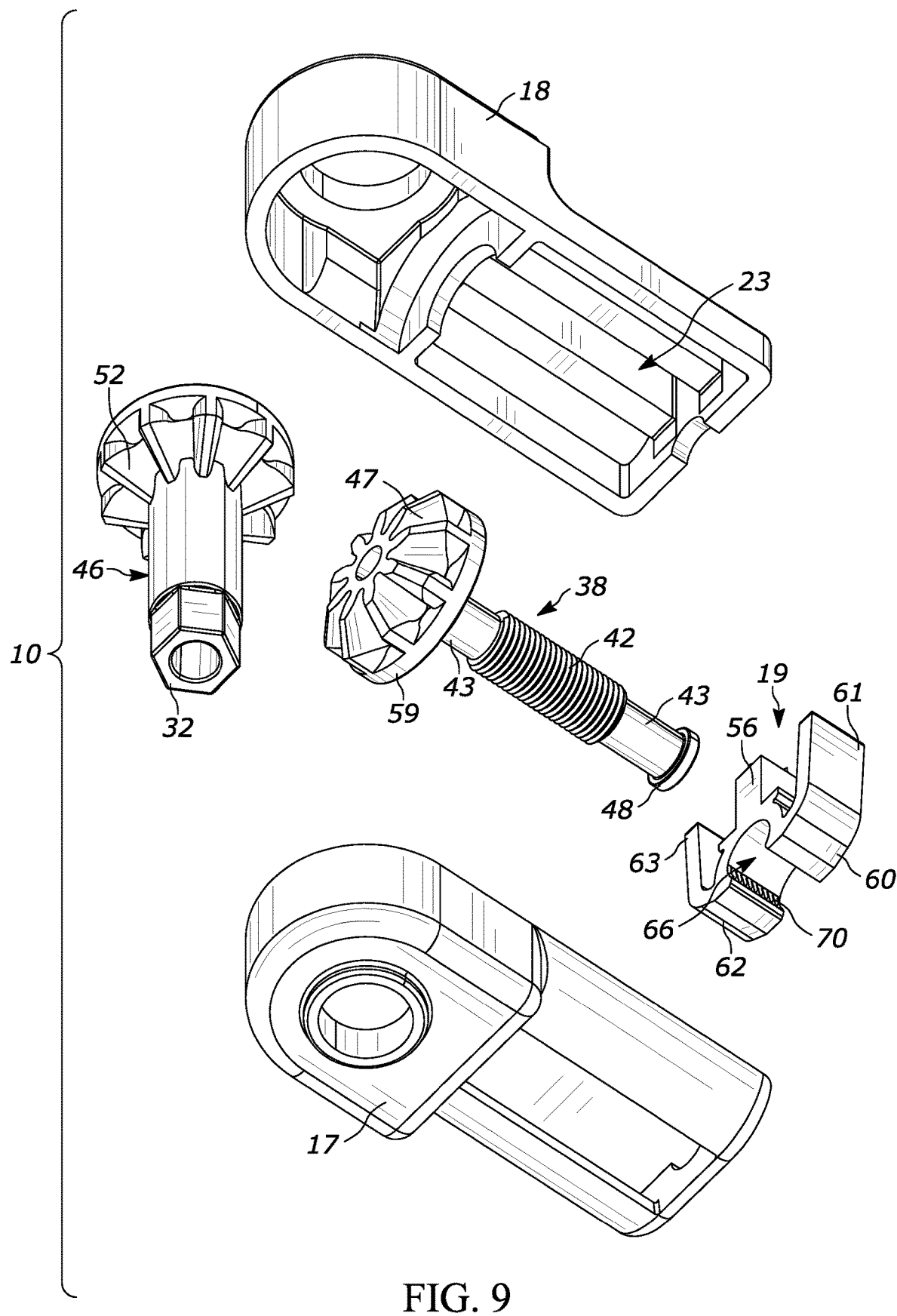
FIG. 9 is a bottom perspective exploded view of the first vehicle headlight aiming device of FIG. 3.
Figure 10:
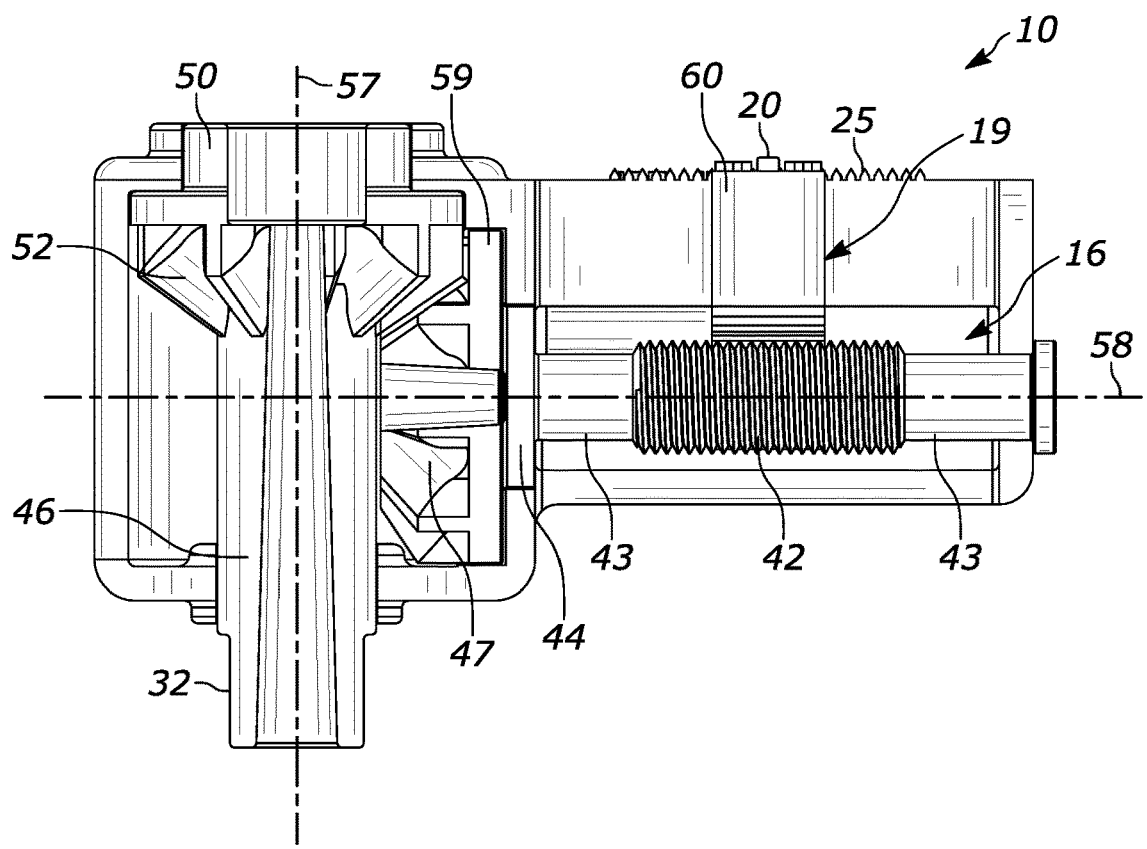
FIG. 10 is cross-sectional side view of the first vehicle headlight aiming device taken along line 10-10 of FIG. 6.

The indicator nut 19 includes a base 56 with a nut indicator mark 20 positioned along a base top 55 (although the mark can be provided in another location of the indicator nut 19), a pair of legs including a first leg 60 and a second leg 62 that extend from a base bottom 64, and an expandable threaded opening 66 formed between a first threaded wall 68 of the first leg 60 and an opposing second threaded wall 70 of the second leg 62, wherein the first threaded wall 68 and second threaded wall 70 are engageable with the threaded portion 42 of the screw shaft 40. The first leg 60 further includes a first upper leg portion 61 and the second leg 62 further includes a second upper leg portion 63. When the first threaded wall 68 and second threaded wall 70 are engaged with the threaded portion 42 as seen in FIGS. 1-7 (i.e., an engaged position), rotation of the output screw 38 forces longitudinal movement of the indicator nut 19 along the upper housing portion 17 to provide a visual indication of relative direction and position of movement of the ball stud 24, noting that when the first threaded wall 68 and second threaded wall 70 are engaged with the non-threaded portion 43 (i.e., a non-engaged position) as seen in FIG. 8, the indicator nut 19 does not move during rotation of the output screw 38 as it is not threadingly engaged. This non-engaged position can prevent damage to the first vehicle headlight aiming device 10 due to over-adjustment in either direction as well as provide a first installation position to allow initial aiming without interference of the indicator nut 19, followed by a second installation position where the indicator nut 19 is engaged with the threaded portion 42 to provide translation thereof.

As described above, the aiming device 10 allows for manual zeroing (i.e., relocation to a zero mark) of the nut indicator mark 20, or relocation to another non-zero mark if desired, by moving the indicator nut 19. This is typically done after the adjuster assembly 14 has been utilized to rotate the ball stud 24 to aim the lamps or headlamp assembly as desired. To relocate the indicator nut 19 so that the nut indicator mark 20 lines up with a desired fixed position housing indicator mark 25. Moving the indicator nut 19 without rotating the screw shaft 40 (or moving the ball stud 24) involves actuation of the pair of legs 60, 62 (e.g., operator pushing the first upper leg portion 61 and second upper leg portion 63 towards each other). The actuation occurs against an inherent material spring bias and expands the size of the threaded opening 66, to sufficiently disengage the first threaded wall 68 and second threaded wall 70 from the threaded portion 42 allowing longitudinal movement of the indicator nut 19 along the screw chamber 16 without interference from the threaded portion 42. Once the nut indicator mark 20 lines up with a desired fixed position housing indicator mark 25 on the device housing 15 accomplished by sliding the indicator nut 19 along the screw chamber 16 and the one or more longitudinal slots 23, the operator releases tension on the first upper leg portion 61 and second upper leg portion 63 thereby allowing the spring bias to reengage the first threaded wall 68 and second threaded wall 70 with the threaded portion 42 of the screw shaft 40, interlocking the indicator nut 19 with the output screw 38.

The input drive gear 46 typically rotates along a central input drive gear axis 57 (FIG. 10) that extends perpendicular to a longitudinal central output screw axis 58, wherein an operator can engage the input portion 50 (via an input recess 51 or a shaped-protrusion) with an adjuster tool to rotate the input drive gear 46 in a clockwise or counter-clockwise direction. As the input drive gear 46 is at least indirectly coupled with the output screw 38 (such as via engagement of drive gear teeth 52 and screw gear teeth 47), rotation of the input drive gear 46 causes rotation of the output screw 38 as well the adjuster input gear 28 (via the engagement of the adjuster input head 30 with the output portion 32). As such, the adjuster 12 is activated causing the ball stud 24 to move, as well as the indicator nut 19, providing an operator with visual position indication related to the aiming of the lamp/lamp assembly.

Referring now to FIGS. 12-16, various view of an exemplary second vehicle headlight aiming device 110 are provided, including perspective, exploded, and cross-sectional views. Although the aiming device 110 varies from the aiming device 10, they both are configured for use with a typical lamp adjuster, such as adjuster 12, to provide a visual indication regarding an aiming adjustment. Similar to the aiming device 10, the aiming device 110 includes a device housing 115 that can be formed of two or more portions, such as a lower housing portion 117 and an upper housing portion 118 that are secured together after insertion of various components therein. As seen in the FIGS., in at least some embodiments the device housing 115 is shown with various exemplary mounting tabs 151 for easily securing the aiming device 110 in a desired position on a vehicle or headlamp assembly. The various mounting tabs 151 can vary in size, shape, position, and quantity, and are not required, but shown to illustrate one of the ways the aiming device 110 can be configured. In addition, the aiming device 110 can be coupled with the adjuster 12 in any of various methods, such as those described above with regard to the aiming device 10.

The device housing 115 further includes a screw chamber 116 formed in the device housing 115 as well as a pair of longitudinal slots including a first slot 123 and second slot 124 that extend over the screw chamber 116 and in communication therewith. The screw chamber 116 includes longitudinally extending opposing inner side wall surfaces 165 that extend between a housing bottom surface 167 and the longitudinal slots. In addition, one or more visible fixed position housing indicator marks 125 can be longitudinally spaced along the upper housing portion 118 adjacent the longitudinal slots. The aiming device 110 further includes an output screw 138 having a screw shaft 140 with a threaded portion 142, a screw first end 144 that is rotationally coupled at least indirectly with an input drive gear 146, wherein the input drive gear 146 can in at least some embodiments include a drive gear 145 coupled to an input drive 149 (e.g., via shaped mating protrusion and recess), while in other embodiments, the input drive gear 146 can be integrally formed. The output screw 138 further includes a screw second end 148. The input drive gear 146 can take many forms, although in at least some embodiments it is an integrally formed or separately coupled components that further include an output portion 132, an input portion 150, and drive gear teeth 152. In addition, the screw first end 144 is rotatably coupled with or integrally formed with a screw bevel gear 159 having screw gear teeth 147 for engagement with the drive gear teeth 152.

The aiming device 110 further includes an indicator nut 119, which includes many features found in the indicator nut 19. The indicator nut 119 in at least some embodiments, includes a base 156 with a nut indicator 120 and/or an indicator window 133 positioned along a base top 155, a pair of legs including a first leg 160 and a second leg 162 that extend from a base bottom portion 164, and an expandable threaded opening 166 extending between a first threaded wall 168 of the first leg 160 and a second threaded wall 170 of the second leg 162, wherein the first threaded wall 168 and second threaded wall 170 are engageable with the threaded portion 142 of the screw shaft 140. The first leg 160 further includes an upward extending first upper leg portion 161 and an outwardly extending first leg rib 171. The second leg 162 further includes an upward extending second upper leg portion 163 and an outwardly extending second leg rib 173. In at least some embodiments, the first upper leg portion 161 and second upper leg portion 163 are bent outwardly.

The upper housing portion 118 further includes a first notch 175 opposite a second notch 177, wherein the first notch 175 includes a first notch wall 178 and the second notch 177 includes a second notch wall 179, and wherein the first notch 175 and second notch 177 are sized to respectively receive the first leg 160 and second leg 162 partially therein.

Figure 12:
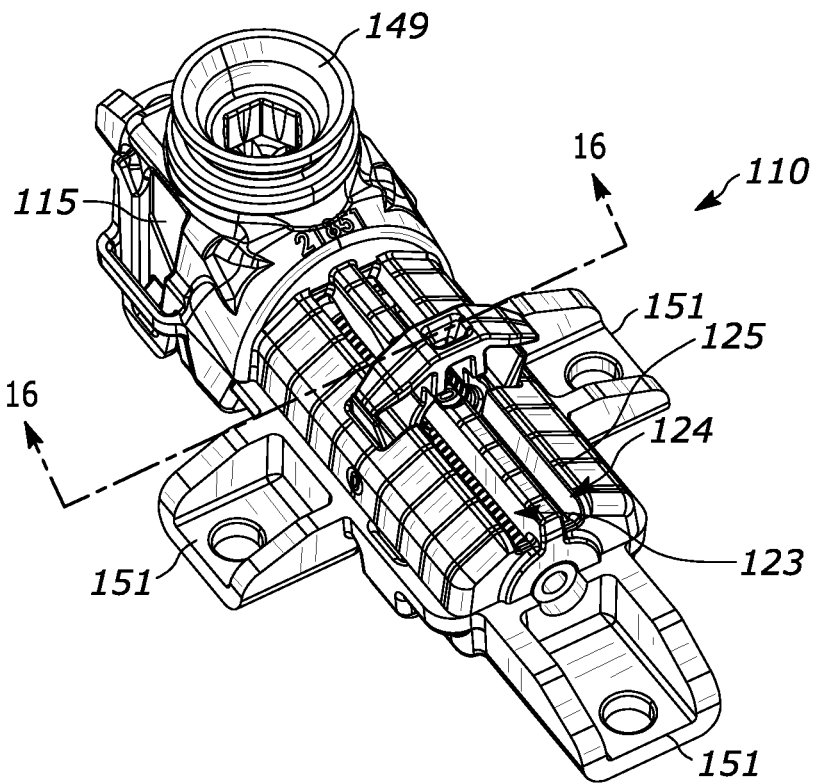
FIG. 12 is a top perspective view of an exemplary second vehicle headlight aiming device with an indicator nut in a first installation position.
Figure 13:
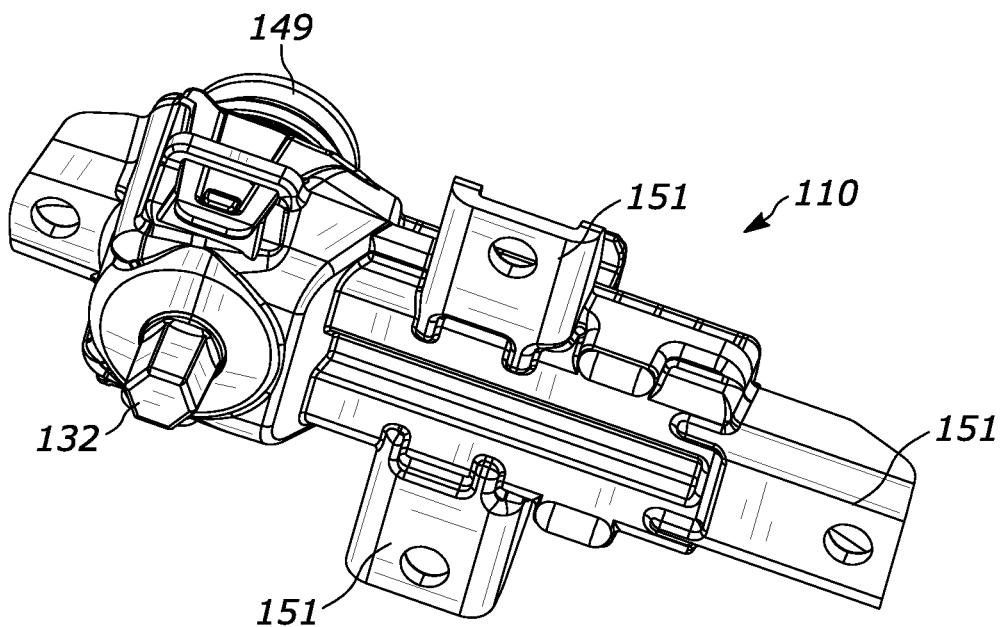
FIG. 13 is a bottom perspective view of the second vehicle headlight aiming device of FIG. 12.
Figure 14:
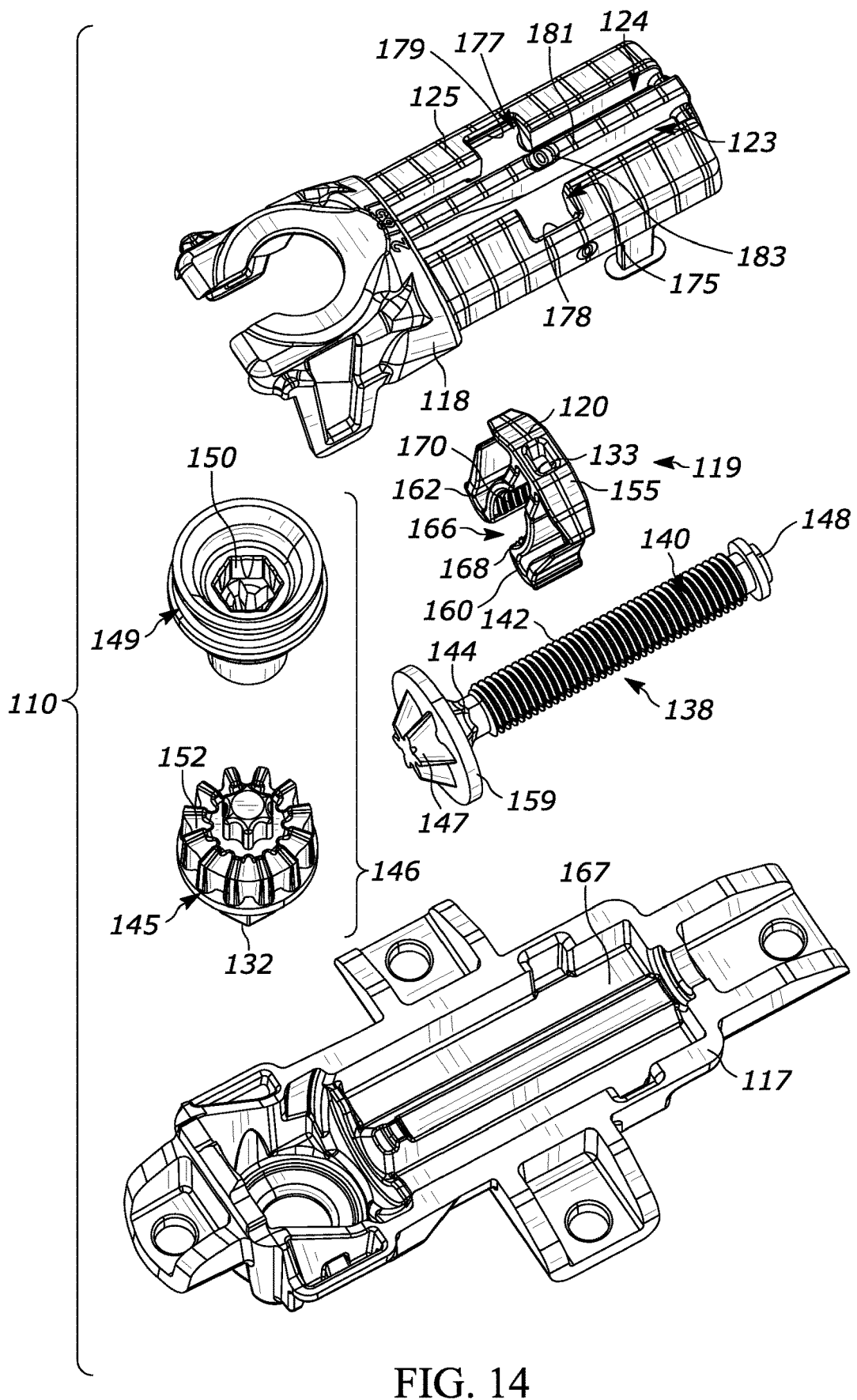
FIG. 14 is a top perspective exploded view of the second vehicle headlight aiming device of FIG. 12.
Figure 15:
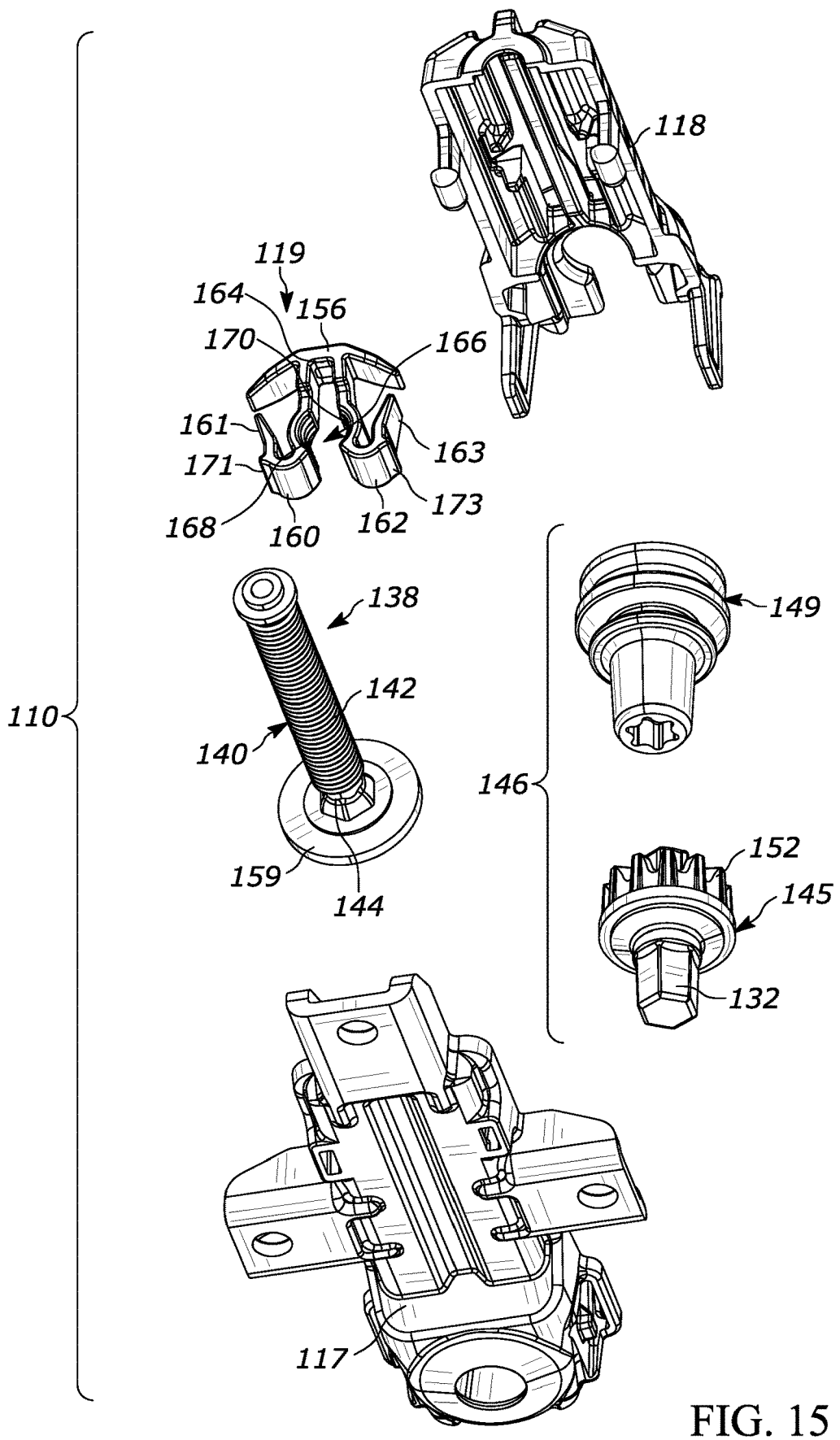
FIG. 15 is a bottom perspective exploded view of the second vehicle headlight aiming device of FIG. 12.
Figure 16:
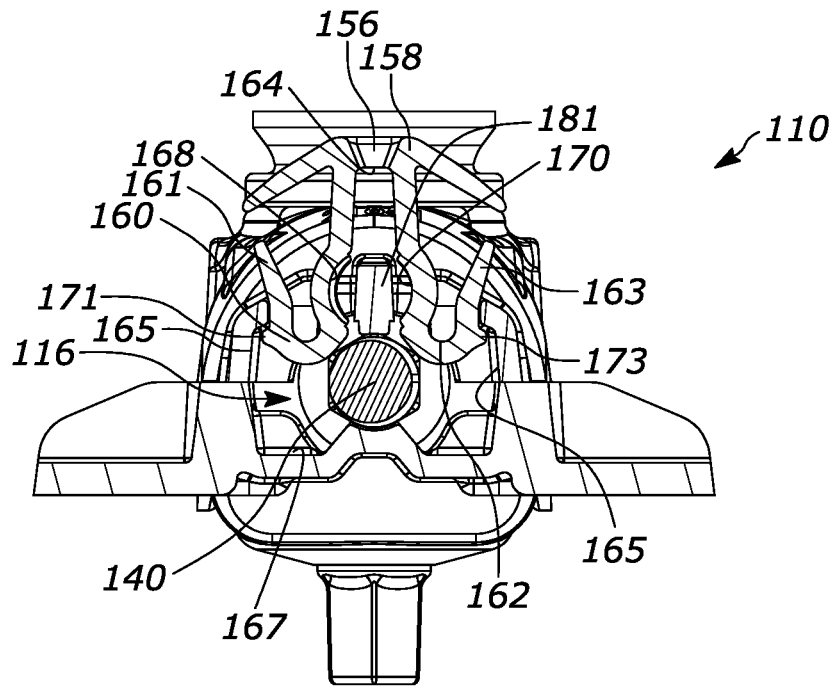
FIG. 16 is a front cross-sectional view of the second vehicle headlight aiming device taken along line 16-16 of FIG. 12.
Figure 17:
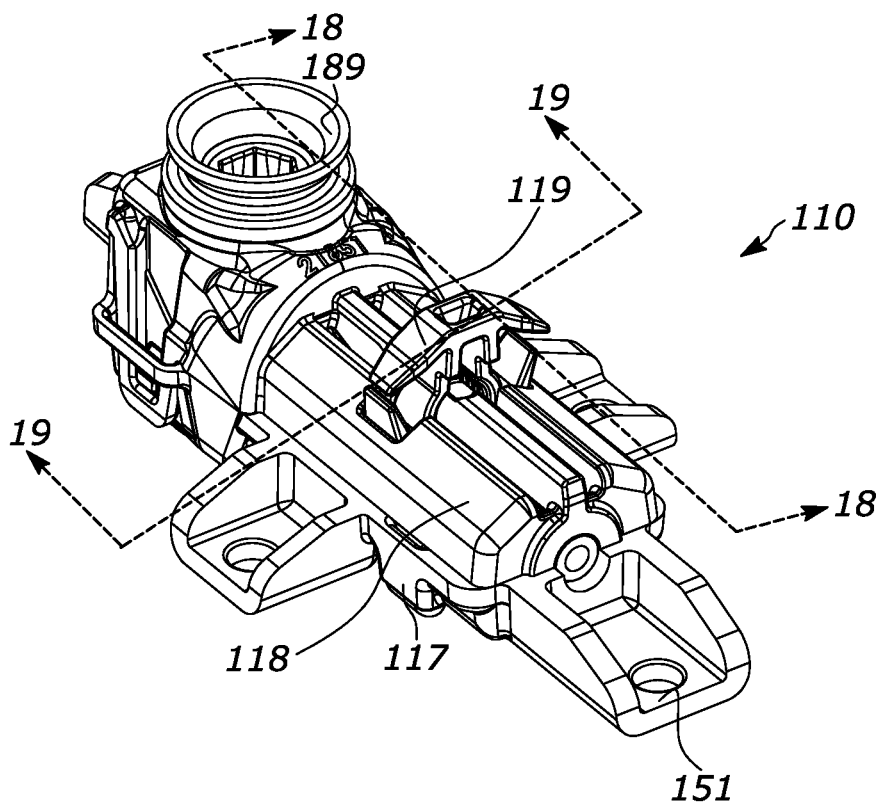
FIG. 17 is a perspective view of the second vehicle headlight aiming device with an indicator nut in a second installation position.
Figure 18:
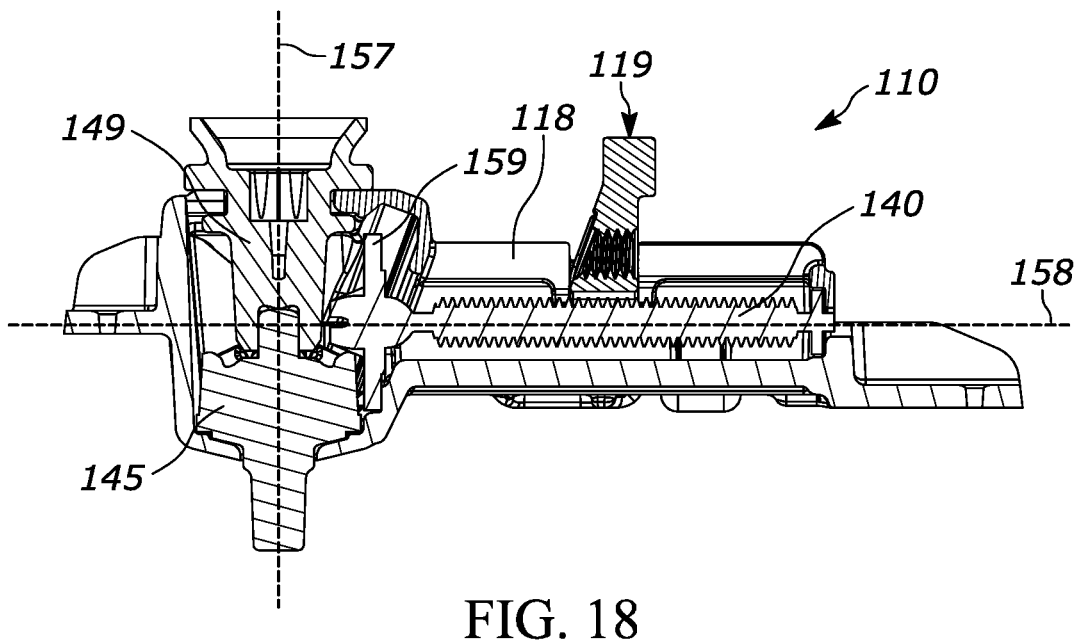
FIG. 18 is a side cross-sectional view of the second vehicle headlight aiming device taken along line 18-18 of FIG. 17.
Figure 19:
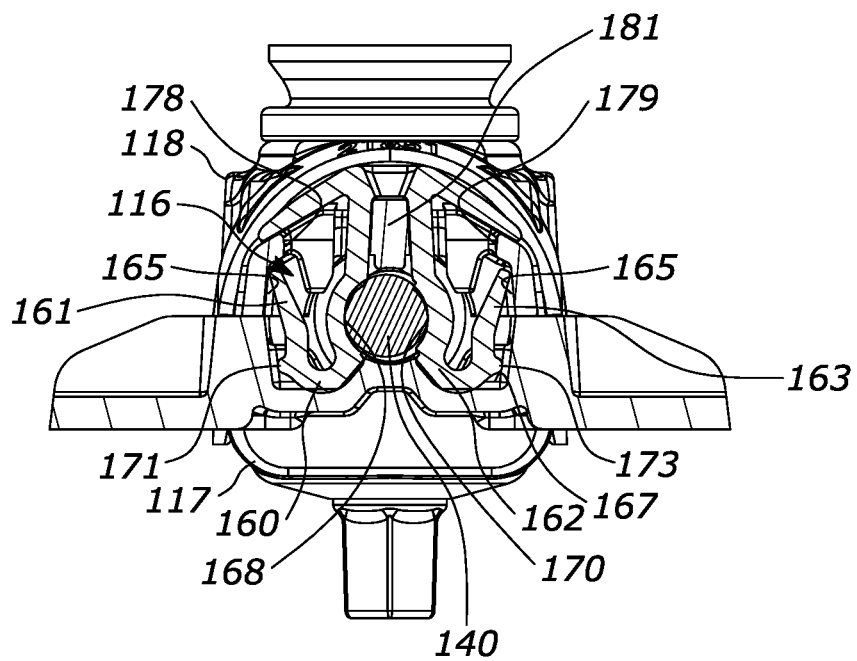
FIG. 19 is a front cross-sectional view of the second vehicle headlight aiming device taken along line 19-19 of FIG. 17.
Figure 20:
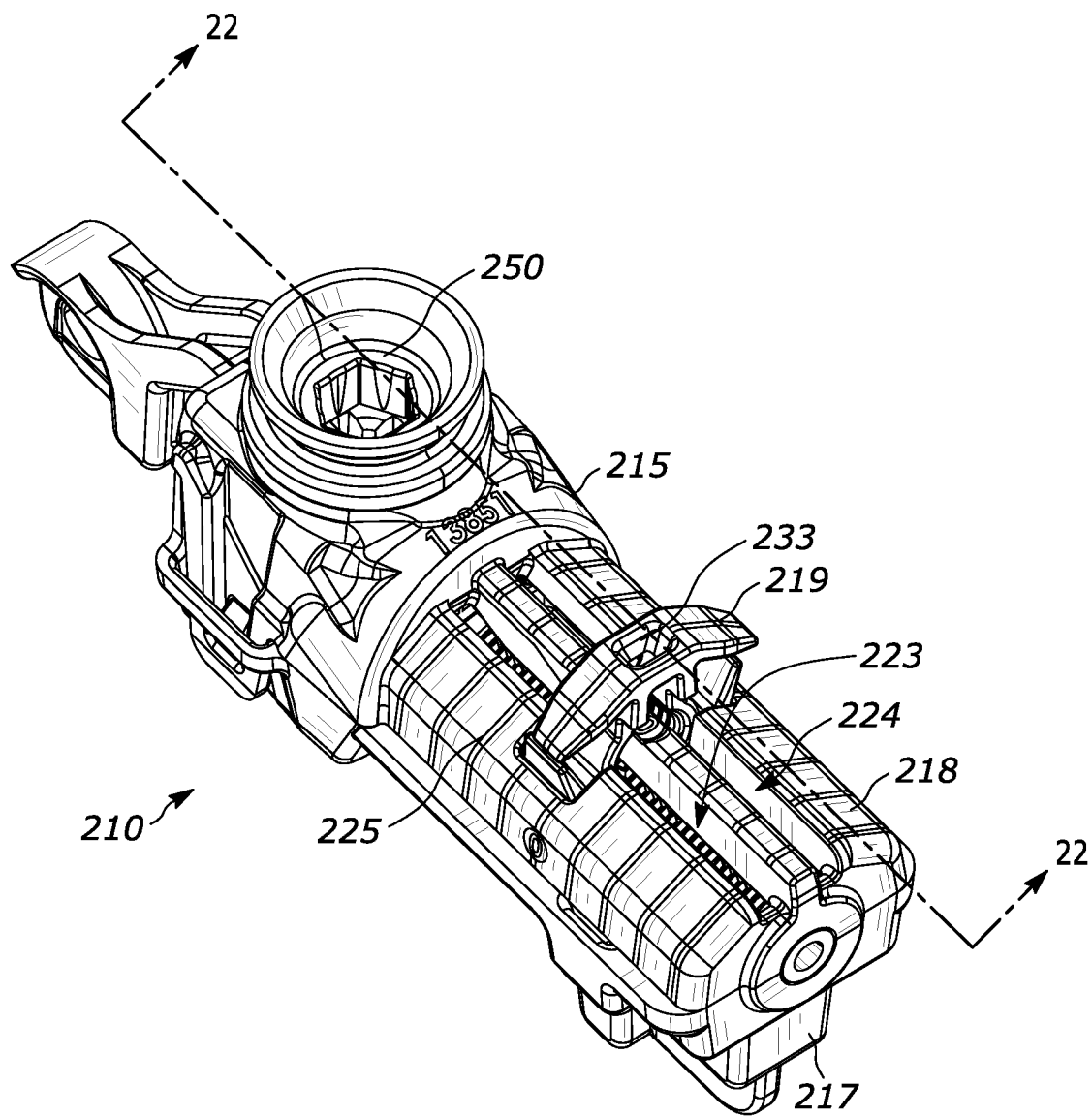
FIG. 20 is a top perspective view of an exemplary third vehicle headlight aiming device with an indicator nut shown in a first installation position.
Figure 21:
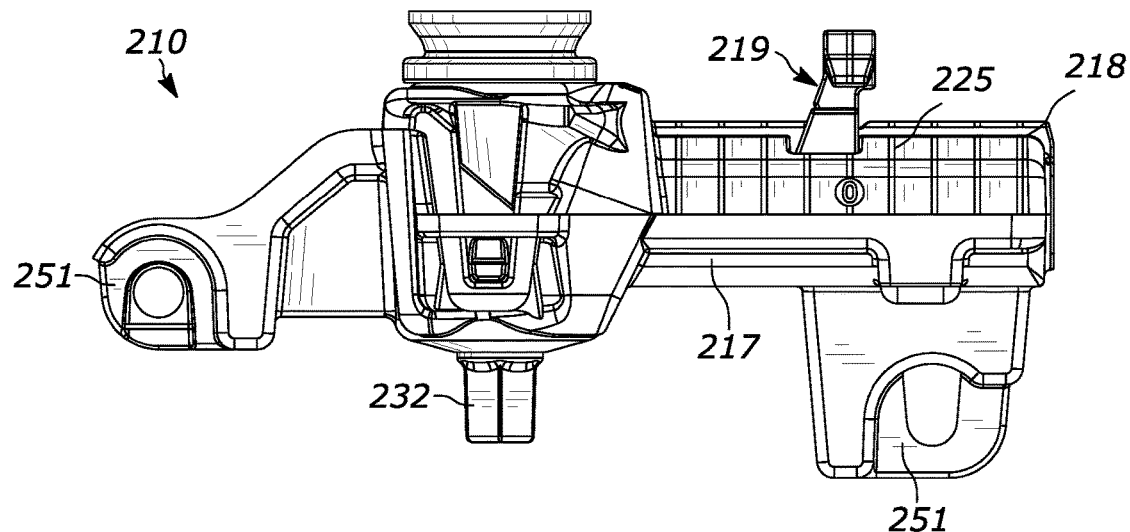
FIG. 21 is a side view of the third vehicle headlight aiming device of FIG. 20.
Figure 22:
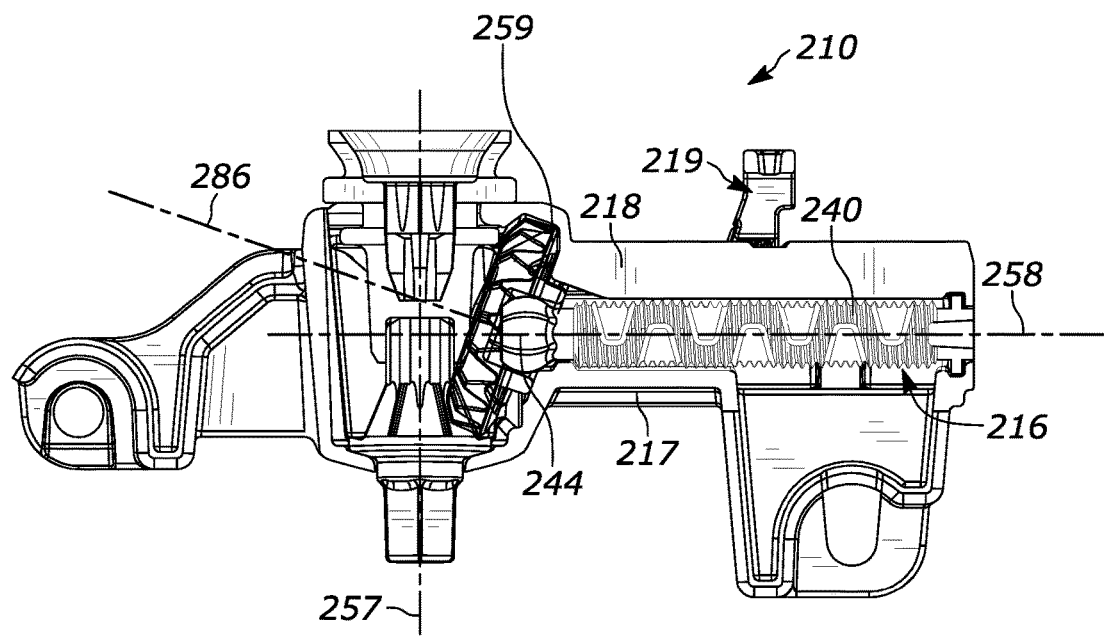
FIG. 22 is a side cross-sectional view of the third vehicle headlight aiming device taken along line 22-22 of FIG. 20.
Figure 23:
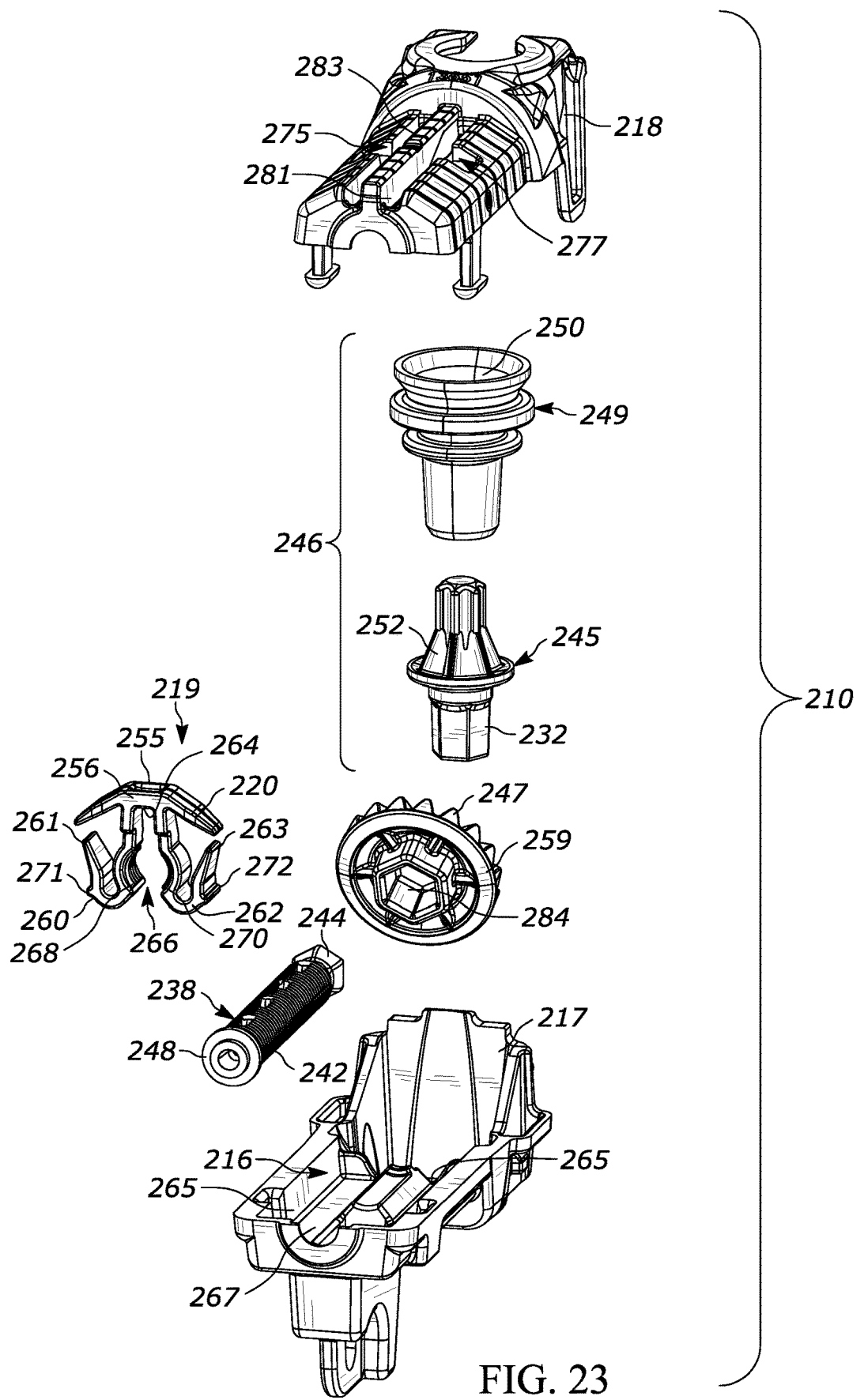
FIG. 23 is an exploded front perspective view of the third vehicle headlight aiming device of FIG. 20.
Figure 24:
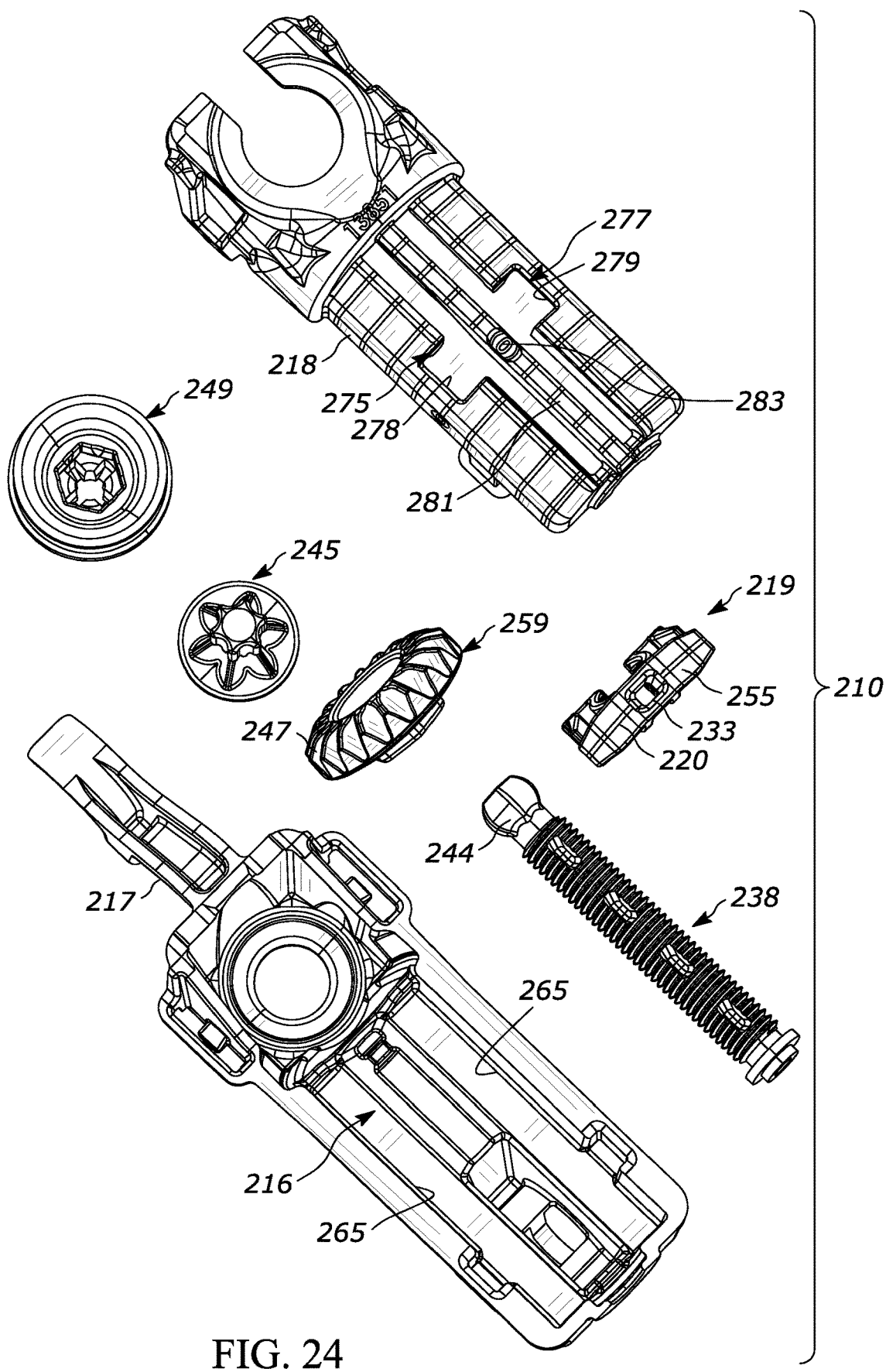
FIG. 24 is an exploded top perspective view of the third vehicle headlight aiming device of FIG. 20.

The indicator nut 119 is positionable in both a first installation position, such as seen in FIGS. 12 and 16, and a second installation position, such as seen in FIGS. 17-19. In the first installation position, the indicator nut 119 is partially inserted into the screw chamber 116 and coupled to the device housing 115 with the first leg 160 received in the first notch 175 and the second leg 162 received in the second notch 177, and with the first leg rib 171 situated under the first notch wall 178 and the second leg rib 173 situated under the second notch wall 179, and with the first upper leg portion 161 extending above the first notch wall 178 and the second upper leg portion 163 extending above the second notch wall 179. In this first installation position, the indicator nut 119 is coupled to the device housing 115, but not movably engaged with the output screw 138 (see FIG. 16). As such, the indicator nut 119 is held in a temporary disengagement with the screw shaft 140, which allows an operator to adjust the aim of a lamp interconnected with the adjuster 12 coupled to the second vehicle headlight aiming device 110 without moving the indicator nut 119.

After an aiming adjustment has been performed by an operator engaging the input portion 150 of the input drive gear 146 and rotating it, causing the interconnected adjuster 12 to move its ball stud 24 inwards or outwards, indicator nut 119 can be placed in a second installation position (as seen in FIGS. 17-19) via further insertion of the indicator nut 119 into the screw chamber 116, wherein in at least some embodiments, the second installation position is achieved by pressing down on the base top 155 of indicator nut 119 to cause the first upper leg portion 161 and second upper leg portion 163 to flex inwards as the indicator nut 119 further enters the screw chamber 116, the abutment of the first threaded wall 168 and second threaded wall 170 with the screw shaft 140 causes the size of the expandable threaded opening 66 to increase, allowing the first threaded wall 168 and second threaded wall 170 to pass onto the screw shaft 140 and fully engage with the threaded portion 142. This downward insertion also pushes the first leg 160 and the second leg 162 fully inside the screw chamber 116, with the first leg 160 passing under the first notch wall 178 and the second leg 162 passing under the second notch wall 179 to lock the first leg 160 and the second leg 162 inside the screw chamber 116. In this position, the opposing inner side wall surfaces 165 that extend between the housing bottom surface 167 and the longitudinal slots 123, 124 guide translation of the indicator nut 119 inside the screw chamber 116 during movement. In addition, in at least some embodiments, the upper housing portion 118 includes a longitudinal guide 181 extending centrally between the longitudinal slots 123, 124, wherein the base bottom portion 164 and first leg 160 and the second leg 162 at least partially about the guide 181 providing alignment of the indicator nut 119 relative to the upper housing portion 118 and the screw shaft 140. The guide 181 can also include guide markings 183 that are then visible through the indicator window 133 to provide relative position information.

Once indicator nut 119 is threadingly engaged with the screw shaft 140, rotation of the screw shaft 140 via the input drive 149, translates the indicator nut 119 longitudinally, thereby moving the nut indicator 120 and/or an indicator window 133 relative to the fixed position housing indicator marks 125 and/or guide markings 183.

Referring now to FIGS. 20-24 an exemplary third vehicle headlight aiming device 210 is shown including a device housing 215. The device housing 215 includes a lower housing portion 217 and an upper housing portion 218 that are secured together after insertion of various components therein. The upper housing portion 218 is in at least some embodiments, identical in form and function with the aforementioned upper housing portion 118, whereas the lower housing portion 217 has a more vertical orientation with regard to a one or more exemplary mounting tabs 251 for easily securing the aiming device 210 in a desired position on a vehicle or headlamp assembly. The various mounting tabs 251 can vary in size, shape, position, and quantity, and are not required.

The third vehicle aiming device 210 operates similar to the second vehicle headlight aiming device 110 and further includes a screw chamber 216 formed in the device housing 215, as well as a pair of longitudinal slots including a first slot 223 and second slot 224, which extend over the screw chamber 216 and in communication therewith. The screw chamber 216 includes longitudinally extending opposing inner side wall surfaces 265 that extend between a housing bottom surface 267 and the longitudinal slots 223, 224. In addition, one or more visible fixed position housing indicator marks 225 are longitudinally spaced along the upper housing portion 218 adjacent the longitudinal slots 223, 224. The aiming device 210 further includes an output screw 238 having a screw shaft 240 with a threaded portion 242, a screw first end 244 that is rotationally coupled at least indirectly with an input drive gear 246 that in at least some embodiments, can include a drive gear 245 coupled to an input drive 249 (e.g., via shaped mating protrusion and recess). The output screw 238 further includes a screw second end 248. The input drive gear 246 can take many forms, although in at least some embodiments it is comprised of integrally formed or separately coupled components that include the output portion 232, an input portion 250, and drive gear teeth 252.

In at least some embodiments, the screw first end 244 is rotatably coupled with a screw bevel gear 259 having screw gear teeth 247 for engagement with the drive gear teeth 252. In at least some embodiments, the rotational coupling can include the screw first end 244 having a hex-ball shape configured to engage a shaped bevel gear inner cavity 284 arranged circumferentially inside the screw bevel gear 259. This particular engagement allows the screw bevel gear 259 to be offset such that a central screw bevel gear axis 286 is not perpendicular or parallel with, a central input drive gear axis 257 or a longitudinal central output screw axis 258.

The aiming device 210 further includes an indicator nut 219, which in at least some embodiments, is identical in form and function to the indicator nut 119. The indicator nut 219 in at least some embodiments, includes a base 256 with a nut indicator 220 and/or an indicator window 233 positioned along a base top 255, a pair of legs including a first leg 260 and a second leg 262 extending from a base bottom portion 264, and an expandable threaded opening 266 extending between a first threaded wall 268 of the first leg 260 and a second threaded wall 270 of the second leg 262, wherein the first threaded wall 268 and second threaded wall 270 are engageable with the threaded portion 242 of the screw shaft 240. The first leg 260 further includes an upward extending first upper leg portion 261 and an outwardly extending first leg rib 271. The second leg 262 further includes an upward extending second upper leg portion 263 and an outwardly extending second leg rib 273. In at least some embodiments, the first upper leg portion 261 and second upper leg portion 263 are bent outwardly.

The upper housing portion 218 is in at least some embodiments, identical to the upper housing portion 118 and includes a first slot 223 and a second slot 224. The first slot including a first notch 275 opposite a second notch 277 in the second slot 224, wherein the first notch 275 includes a first notch wall 278 and the second notch 277 includes a second notch wall 279, and wherein the first notch 275 and second notch 277 are sized to respectively receive the first leg 260 and second leg 262 partially therein. The upper housing portion 218 further includes a longitudinal guide 281 extending centrally between the longitudinal slots 223, 224, wherein the base bottom portion 264 and first leg 260 and the second leg 262 abut the longitudinal guide 281 providing alignment of the indicator nut 219. The longitudinal guide 281 can also include guide markings 283 that are then visible through the indicator window 233 to provide relative position information.

The installation procedure including the first and second installation positions for the aiming device 210, are the same as described above with regard to the aiming device 110, as such they are not repeated here, and the aiming device 210 provides the same overall functional position indication of the indicator nut relative to the upper housing portion using various marks.

The aiming devices 10, 110, 210 provide significant versatility with regard to position indication. For example, the threads on the threaded portion (and the legs) can be chosen (e.g., pitch, etc.) to provide for a desired higher or lower degree of movement of the nut indicator mark relative to the rotation of the input drive gear, in addition, coupled gearing between the input drive gear and output screw can sized to vary the degree of movement as well. Although various fixed position housing indicator marks are illustrated on the various device housings, it shall be understood that the size, spacing, and quantity of such marks can vary as desired.

Although the invention has been herein described in what is perceived to be the most practical and preferred embodiments, it is to be understood that the invention is not intended to be limited to the specific embodiments set forth above, but include modified forms of those embodiments including portions of the embodiments and combinations of elements of different embodiments as come within the scope of the following claims. Further, it is recognized that modifications may be made by one of skill in the art of the invention without departing from the spirit or intent of the invention and, therefore, the invention is to be taken as including all reasonable equivalents to the subject matter of the appended claims and the description of the invention herein. And, although certain advantages of different embodiments and disadvantages of certain prior art are described, no single claim must realize every or any benefit or overcome every or any disadvantage.

We claim:

1. A vehicle headlight aiming device comprising:

A device housing including a screw chamber, an upper housing portion, and a lower housing portion;

an input drive gear;

an output screw having a screw shaft with a threaded portion, a screw first end that is rotatably coupled at least indirectly with the input drive gear, and a screw second end;

a central longitudinal screw axis extending through the output screw;

an indicator nut having a base with a nut indicator mark, a first leg and second leg extending from a base bottom portion, and an expandable threaded opening extending between a first threaded wall of the first leg and a second threaded wall of the second leg, the first threaded wall and the second threaded wall are selectively engageable with the threaded portion of the screw shaft;

wherein the output screw engages with the input drive gear via a screw bevel gear in communication with the screw first end, such that rotation of the input drive gear causes rotation of the output screw;

wherein the upper housing portion includes one or more longitudinal slots and one or more spaced position housing indicator marks for referencing a position of the nut indicator mark relative to the upper housing portion;

wherein the base includes a base top with the nut indicator mark thereon, and wherein the base top is longitudinally translatable along the upper housing portion and adjacent to the one or more spaced position housing indicator marks;

wherein the input drive gear includes an input portion and an output portion extending along a central input drive gear axis, wherein the input portion is engageable to effectuate rotation of the input drive gear, and the output portion is engageable with an adjuster having a ball stud, such that rotation of the input drive gear actuates the adjuster to extend or retract the ball stud and translates the indicator nut along the screw shaft to provide a position indication;

wherein the screw chamber extends between the lower housing portion and the upper housing portion, and includes longitudinally extending inner side wall surfaces that extend between a housing bottom surface and the one or more longitudinal slots;

wherein the upper housing portion further includes a first notch opposite a second notch, wherein the first notch includes a first notch wall and the second notch includes a second notch wall, and wherein the first notch and the second notch are sized to respectively receive the first leg and the second leg partially therein;

wherein the first leg includes a first leg rib extending therefrom and the second leg includes a second leg rib extending therefrom;

wherein the first leg includes a bent first upper leg portion and the second leg includes a bent second upper leg portion; and wherein in a first installation position, the indicator nut is coupled to the device housing with the first leg received in the first notch and the second leg received in the second notch, and with the first leg rib situated under the first notch wall and the second leg rib situated under the second notch wall, and with the bent first upper leg portion extending above the first notch wall and the bent second upper leg portion extending above the second notch wall.

2. The vehicle headlight aiming device of claim 1, wherein the screw shaft further includes a non-threaded portion adjacent at least one of the screw first end and the screw second end.

3. The vehicle headlight aiming device of claim 1, wherein the screw bevel gear is integrally formed with the output screw and centered about the central longitudinal screw axis.

4. The vehicle headlight aiming device of claim 1, wherein in a second installation position, the indicator nut is threadingly coupled to the output screw with the first leg and the second leg both positioned inside the screw chamber with the first leg situated under the first notch wall and the second leg situated under the second notch wall.

5. The vehicle headlight aiming device of claim 4, wherein the one or more longitudinal slots include a first slot and a second slot.

6. The vehicle headlight aiming device of claim 5, wherein the upper housing portion further includes a longitudinal guide extending centrally between the first slot and the second slot, and wherein the base bottom portion, the first leg, and the second leg each abut the longitudinal guide to provide alignment of the indicator nut relative to the upper housing portion.

7. The vehicle headlight aiming device of claim 6, wherein the base further includes a base top with an indicator window.

8. The vehicle headlight aiming device of claim 7, wherein the longitudinal guide includes guide markings visible through the indicator window to provide a relative position.

9. The vehicle headlight aiming device of claim 4, wherein the screw first end of the output screw is hex-ball shaped and in rotatable engagement with a bevel gear inner cavity of the screw bevel gear, and wherein the screw bevel gear rotates about a central gear axis that is non-coincident with the central longitudinal screw axis, and wherein the screw bevel gear is meshed at least indirectly with the input drive gear, such that rotation of the input drive gear causes rotation of the output screw.

10. A vehicle headlight aiming device comprising:
a device housing including a screw chamber, an upper housing portion, and a lower housing portion;
an input drive gear;
an output screw having a screw shaft with a threaded portion, a screw first end that is rotationally coupled at least indirectly with the input drive gear, and a screw second end;
a central longitudinal screw axis extending through the output screw;
an indicator nut having a base with a nut indicator mark, a first leg and second leg extending from a base bottom portion, and an expandable threaded opening extending between a first leg and a second leg, wherein at least one of the first leg and second leg includes a threaded wall that is selectively engageable with the threaded portion of the screw shaft;
wherein the output screw engages with the input drive gear via a screw bevel gear in communication with the screw first end, such that rotation of the input drive gear causes rotation of the output screw;
wherein the upper housing portion includes one or more longitudinal slots and one or more spaced position housing indicator marks for referencing a position of the nut indicator mark relative to the upper housing portion;
wherein the base includes a base top with the nut indicator mark thereon, and wherein the base top is longitudinally translatable along the upper housing portion and adjacent to the one or more spaced position housing indicator marks;
wherein the input drive gear includes an input portion and an output portion extending along a central input drive gear axis, wherein the input portion is engageable to effectuate rotation of the input drive gear;
wherein the screw chamber extends between the lower housing portion and the upper housing portion, and includes longitudinally extending inner side wall surfaces that extend between a housing bottom surface and the one or more longitudinal slots;
wherein the upper housing portion further includes a first notch opposite a second notch, wherein the first notch includes a first notch wall and the second notch includes a second notch wall, and wherein the first notch and the second notch are sized to respectively receive the first leg and the second leg partially therein;
wherein the first leg includes a first leg rib extending therefrom and the second leg includes a second leg rib extending therefrom;
wherein the first leg includes a first upper leg portion and the second leg includes a bent second upper leg portion; and
wherein in a first installation position, the indicator nut is coupled to the device housing with the first leg received in the first notch and the second leg received in the second notch, and with the first leg rib situated under the first notch wall and the second leg rib situated under the second notch wall, and with the first upper leg portion extending above the first notch wall and the second upper leg portion extending above the second notch wall.

11. The vehicle headlight aiming device of claim 10, wherein in a second installation position, the indicator nut is threadingly coupled to the output screw with the first leg and the second leg both positioned inside the screw chamber with the first leg situated under the first notch wall and the second leg situated under the second notch wall.

* * * * *